(12) United States Patent
Tamura et al.

(10) Patent No.: US 8,538,254 B2
(45) Date of Patent: Sep. 17, 2013

(54) CAMERA DEVICE AND METHOD FOR ASSEMBLING CAMERA DEVICE

(75) Inventors: Kazushige Tamura, Kanagawa (JP); Yoshihito Urashima, Fukuoka (JP); Yuuya Jikihara, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1 day.

(21) Appl. No.: 13/201,987

(22) PCT Filed: Feb. 19, 2010

(86) PCT No.: PCT/JP2010/001079
§ 371 (c)(1),
(2), (4) Date: Aug. 17, 2011

(87) PCT Pub. No.: WO2010/095451
PCT Pub. Date: Aug. 26, 2010

(65) Prior Publication Data
US 2011/0299843 A1  Dec. 8, 2011

(30) Foreign Application Priority Data
Feb. 19, 2009 (JP) ................................. 2009-035982

(51) Int. Cl.
*G03B 17/02*   (2006.01)
(52) U.S. Cl.
USPC ......................................... 396/535; 396/541
(58) Field of Classification Search
USPC ................ 396/72, 535, 541, 544; 348/208.3, 348/333.06, 207.99, 373, 374
See application file for complete search history.

(56) References Cited

U.S. PATENT DOCUMENTS

| | | | |
|---|---|---|---|
| 6,106,120 A * | 8/2000 | Menard | 353/119 |
| 6,200,042 B1 * | 3/2001 | Tamura et al. | 396/427 |
| 6,375,369 B1 * | 4/2002 | Schneider et al. | 396/427 |
| 6,525,766 B1 * | 2/2003 | Ikoma et al. | 348/151 |
| 7,663,692 B2 * | 2/2010 | Chang | 348/372 |
| 7,690,851 B2 * | 4/2010 | Yamane et al. | 396/427 |

(Continued)

FOREIGN PATENT DOCUMENTS

| | | |
|---|---|---|
| CN | 2379982 | 5/2000 |
| CN | 1315672 | 10/2001 |

(Continued)

OTHER PUBLICATIONS

International Search Report dated Mar. 30, 2010.
Chinese Office Action dated Jun. 8, 2013.

*Primary Examiner* — Clayton E Laballe
*Assistant Examiner* — Warren K Fenwick
(74) *Attorney, Agent, or Firm* — Dickinson Wright PLLC (57) ABSTRACT

A camera unit (1) of a camera device includes: a lens unit (2) having a size according to zoom magnification; a tilt chassis (3) that rotatably supports the lens unit (2) in a tilt direction; and a pan chassis (4) that rotatably supports the lens unit (2) in a pan direction through the tilt chassis (3). The tilt chassis (3) has a plurality of attaching positions to the pan chassis (4). Additionally, the tilt chassis (3) is attached to the pan chassis (4) at an attaching position of the plurality of attaching positions according to the size of the lens unit (2). As a result of this, cost, time, and labor required for development of the chassis can be reduced, and development efficiency of the chassis is improved.

6 Claims, 8 Drawing Sheets

(a)

(b)

(56) References Cited

U.S. PATENT DOCUMENTS

| | | | |
|---|---|---|---|
| 7,719,610 B2 * | 5/2010 | Kung et al. | 348/373 |
| 2002/0010993 A1 * | 1/2002 | Wada et al. | 29/425 |
| 2003/0194230 A1 * | 10/2003 | Tamura | 396/427 |
| 2005/0212958 A1 * | 9/2005 | Su et al. | 348/373 |
| 2008/0124069 A1 * | 5/2008 | Basho | 396/427 |
| 2008/0231699 A1 * | 9/2008 | Konishi et al. | 348/143 |
| 2008/0259159 A1 * | 10/2008 | Nystrom | 348/143 |
| 2010/0111516 A1 | 5/2010 | Basho | |

FOREIGN PATENT DOCUMENTS

| | | |
|---|---|---|
| CN | 1906533 | 1/2007 |
| CN | 101191888 | 6/2008 |
| JP | 2-218273 | 8/1990 |
| JP | 2000-155366 | 6/2000 |
| JP | 2005-221637 | 8/2005 |
| JP | 2008-141233 | 6/2008 |

* cited by examiner

CAMERA DEVICE AND METHOD FOR ASSEMBLING CAMERA DEVICE

TECHNICAL FIELD

The present invention relates to a camera device including a lens unit, which has different sizes according to zoom magnification and, in particular, to a technique that improves development efficiency of a chassis for holding the lens unit.

BACKGROUND ART

Conventionally, a camera device having a zoom function has been generally known (for example, refer to Patent Literature 1). A lens unit of such camera device is often designed in different sizes according to zoom magnification. For example, a size (a width and a height) of a lens unit for large zoom magnification (a lens unit for 30× zoom magnification) is designed larger than that for small zoom magnification (for example, a lens unit for 22× zoom magnification).

However, in a conventional camera device, when lens units for different zoom magnification have been developed individually, the development of chassis is costly, time-consuming, and labor-intensive since the chassis are individually designed for every size of the lens unit. For example, when the lens unit for 22× zoom magnification and the lens unit for 30× zoom magnification are developed individually, a chassis tailored to the lens unit for 30× zoom magnification is designed and developed while a chassis tailored to the lens unit for 22× zoom magnification is designed and developed. As described above, development efficiency of the chassis has been low in the conventional camera device.

CITATION LIST

Patent Literature

Patent Literature 1: Japanese Patent Laid-Open No. 2000-155366

SUMMARY OF INVENTION

Technical Problem

The present invention is made under the above-described background. An object of the present invention is to provide a camera device with which development efficiency of a chassis can be improved.

Solution to Problem

An aspect of the present invention is a camera device, and this camera device includes: a lens unit having a size according to zoom magnification; a tilt chassis for rotatably supporting the lens unit in a tilt direction, the tilt chassis being attached to the lens unit; and a pan chassis for rotatably supporting the lens unit in a pan direction through the tilt chassis, the pan chassis having the tilt chassis attached thereto, and the tilt chassis has a plurality of attaching positions to the pan chassis, and is attached to the pan chassis at an attaching position of the plurality of attaching positions according to the size of the lens unit.

Another aspect of the present invention is a method for assembling a camera device, and this method includes: attaching a tilt chassis to a lens unit having a size according to zoom magnification to rotatably support the lens unit in a tilt direction; and attaching the tilt chassis to a pan chassis to rotatably support the lens unit in a pan direction through the tilt chassis, and the tilt chassis has a plurality of attaching positions to the pan chassis, and is attached to the pan chassis at an attaching position of the plurality of attaching positions according to the size of the lens unit.

As described hereinafter, there are other aspects in the present invention. Hence, disclosure of the present invention is intended to provide some aspects of the present invention, and it is not intended to limit the scope of the invention described and claimed herein.

DESCRIPTION OF EMBODIMENTS

A detail of the present invention will be described hereinafter. However, the following detailed description and appended drawings do not limit the invention. Instead, the scope of the invention is defined by the appended claims.

A camera device of the present invention includes: a lens unit having a size according to zoom magnification; a tilt chassis for rotatably supporting the lens unit in a tilt direction, the tilt chassis being attached to the lens unit; and a pan chassis for rotatably supporting the lens unit in a pan direction through the tilt chassis, the pan chassis having the tilt chassis attached thereto, and the tilt chassis has a configuration to have a plurality of attaching positions to the pan chassis, and to be attached to the pan chassis at an attaching position of the plurality of attaching positions according to the size of the lens unit.

According to this configuration, since the attaching position of the tilt chassis to the pan chassis can be adjusted according to the size of the lens unit, common tilt chassis and pan chassis can be used even though the lens unit is designed in different sizes according to the zoom magnification. Namely, even when lens units for different zoom magnification have been developed individually, the same tilt chassis and pan chassis can be shared. Hence, cost, time, and labor required for development of the chassis can be reduced, and development efficiency of the chassis is improved.

In addition, the camera device of the present invention may have a configuration that the lens unit has a width and a height according to zoom magnification, and that the tilt chassis has a plurality of different attaching positions in a width direction and a height direction of the lens unit, and is attached to the pan chassis at an attaching position of the plurality of attaching positions according to the width and the height of the lens unit.

According to this configuration, since the attaching position of the tilt chassis to the pan chassis can be adjusted according to the width and the height of the lens unit, common tilt chassis and pan chassis can be used to deal with the difference even though the lens unit is designed in a different width or height according to the zoom magnification.

In addition, the camera device of the present invention may have a configuration that a plurality of stepped engagement portions are provided at positions corresponding to the plurality of attaching positions at the tilt chassis and the pan chassis, and that the tilt chassis is attached to the pan chassis at an attaching position of the plurality of attaching positions according to the width and the height of the lens unit by engaging with each other the stepped engagement portions corresponding to the attaching positions according to the width and the height of the lens unit.

According to this configuration, the stepped engagement portions of the tilt chassis and the pan chassis are engaged with each other, and thereby the attaching position of the tilt chassis to the pan chassis can be adjusted according to the width and the height of the lens unit.

In addition, the camera device of the present invention may have a configuration that an optical axis offset according to zoom magnification is set for the lens unit, and that the tilt chassis has a plurality of different attaching positions in an offset direction of the lens unit, and is attached to the pan chassis at an attaching position of the plurality of attaching positions according to the optical axis offset of the lens unit.

According to this configuration, since the attaching position of the tilt chassis to the pan chassis can be adjusted according to the optical axis offset of the lens unit, common tilt chassis and pan chassis can be used to deal with the difference even though a different optical axis offset is set for the lens unit according to the zoom magnification.

In addition, the camera device of the present invention may have a configuration to include a holding ring that holds the tilt chassis and the pan chassis in a state of being attached to the lens unit.

According to this configuration, since the tilt chassis and the pan chassis are held in the state of being attached to the lens unit by attaching the holding ring after attaching the tilt chassis to the pan chassis, assembly work of the camera device becomes easy. Namely, workability of assembly of the camera device is improved.

In a method for assembling a camera device of the present invention including: attaching a tilt chassis to a lens unit having a size according to zoom magnification to rotatably support the lens unit in a tilt direction; and attaching the tilt chassis to a pan chassis to rotatably support the lens unit in a pan direction through the tilt chassis, the tilt chassis has a plurality of attaching positions to the pan chassis, and is attached to the pan chassis at an attaching position of the plurality of attaching positions according to the size of the lens unit.

According to this method, since the attaching position of the tilt chassis to the pan chassis can be adjusted according to the size of the lens unit, the camera device can be assembled using a common tilt chassis and pan chassis even though the lens unit is designed in different sizes according to the zoom magnification.

The present invention can reduce cost, time, and labor required for development of the chassis by providing the tilt chassis attached to the pan chassis at the attaching position according to the size of the lens unit, and thus development efficiency of the chassis is improved.

Hereinafter, a camera device of an embodiment of the present invention will be described using drawings. In the embodiment, will be exemplified a case of a camera device used as a monitoring camera etc. used for monitoring facilities, buildings, etc.

Figure 1:
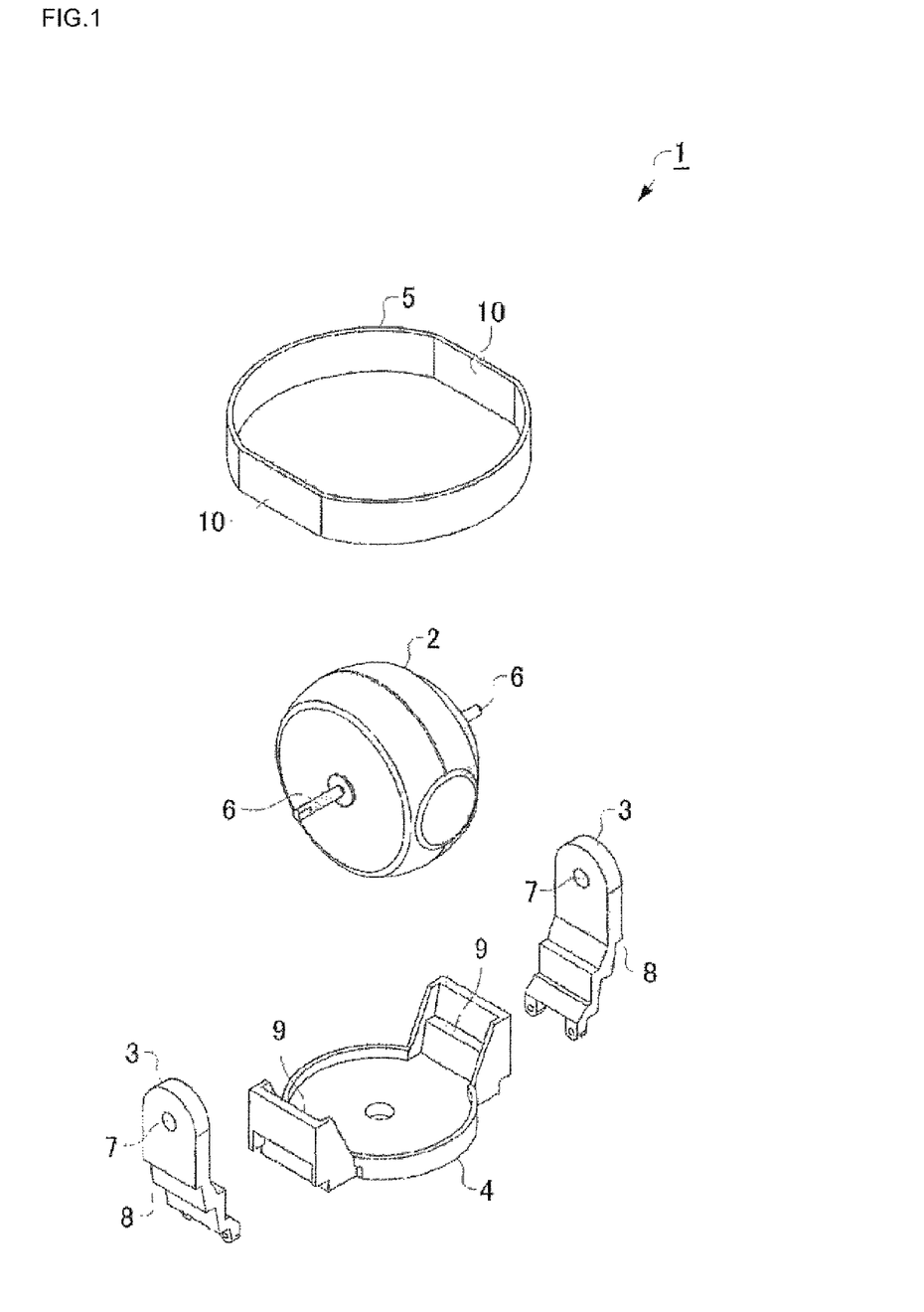
FIG. 1 is an exploded perspective view showing a configuration of a camera unit of a camera device of the embodiment.
Figure 2:
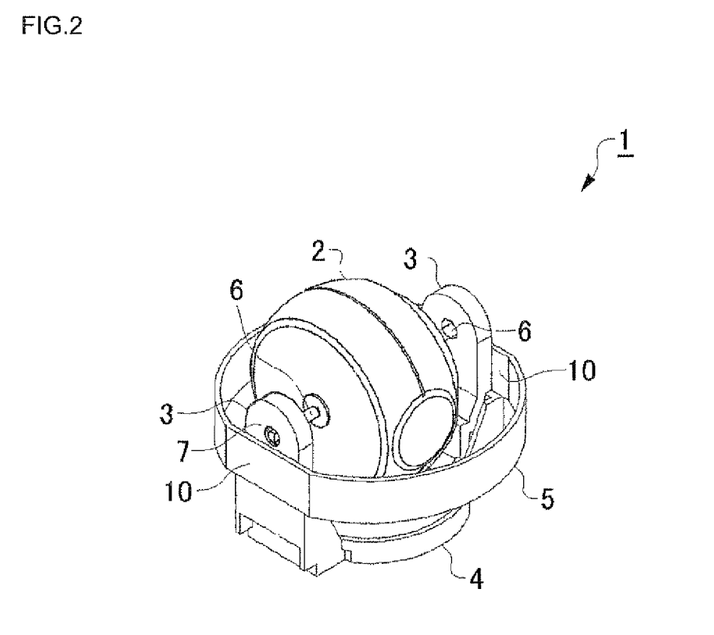
FIG. 2 is a perspective view of the camera unit of the camera device.

First, a configuration of the camera device of the embodiment of the present invention will be described with reference to the drawings. FIG. 1 is an exploded perspective view showing a configuration of a camera unit of the camera device, and FIG. 2 is a perspective view of the camera device. As shown in FIGS. 1 and 2, a camera unit 1 of the camera device includes: a lens unit 2 with a size according to zoom magnification; two tilt chassis 3 for rotatably supporting the lens unit 2 in a tilt direction; a pan chassis 4 for rotatably supporting the lens unit 2 in a pan direction through the tilt chassis 3; and a holding ring 5 that holds the tilt chassis 3 and the pan chassis 4 in a state of being attached to the lens unit 2.

The tilt chassis 3 are attached to a tilt shaft 6 projecting from right and left side surfaces of the lens unit 2. Shaft holes 7 in which the tilt shaft 6 is inserted are provided at upper parts of these tilt chassis 3. In addition, step-like stepped engagement portions 8 are provided at lower parts of the tilt chassis 3. The lens unit 2 supported by the tilt chassis 3 can be rotated in the tilt direction by a drive force of a tilt motor (not shown).

The tilt chassis 3 holding the lens unit 2 are attached to the pan chassis 4. Step-like stepped engagement portions 9 are projectingly provided at both right and left sides of the pan chassis 4. The lens unit 2 supported by the pan chassis 4 through the tilt chassis 3 can be rotated in the pan direction by a drive force of a pan motor (not shown).

The embodiment is configured so that the stepped engagement portions 8 and 9 of the tilt chassis 3 and the pan chassis 4 may engage with each other when the tilt chassis 3 are attached to the pan chassis 4. Engagement positions of these stepped engagement portions 8 and 9 can be displaced vertically. When the engagement positions of the stepped engagement portions 8 and 9 are displaced to a lower side, a space between the two tilt chassis 3 becomes narrow, and positions of the tilt shaft holes 7 of the tilt chassis 3 become low (refer to FIG. 7(a)). When the engagement positions of the stepped engagement portions 8 and 9 are displaced to an upper side, the space between the two tilt chassis 3 becomes wide, and the positions of the tilt shaft holes 7 of the tilt chassis 3 become high (refer to FIG. 7(b)).

As described above, two attaching positions of the tilt chassis 3 (engagement positions of the stepped engagement portions 8 and 9) are provided in the embodiment. In this case, a lower attaching position (engagement position) corresponds to a width and a height of the lens unit 2 for 22× zoom magnification, and an upper attaching position (engagement position) corresponds to a width and a height of a lens unit 20 for 30× zoom magnification.

Figure 7:
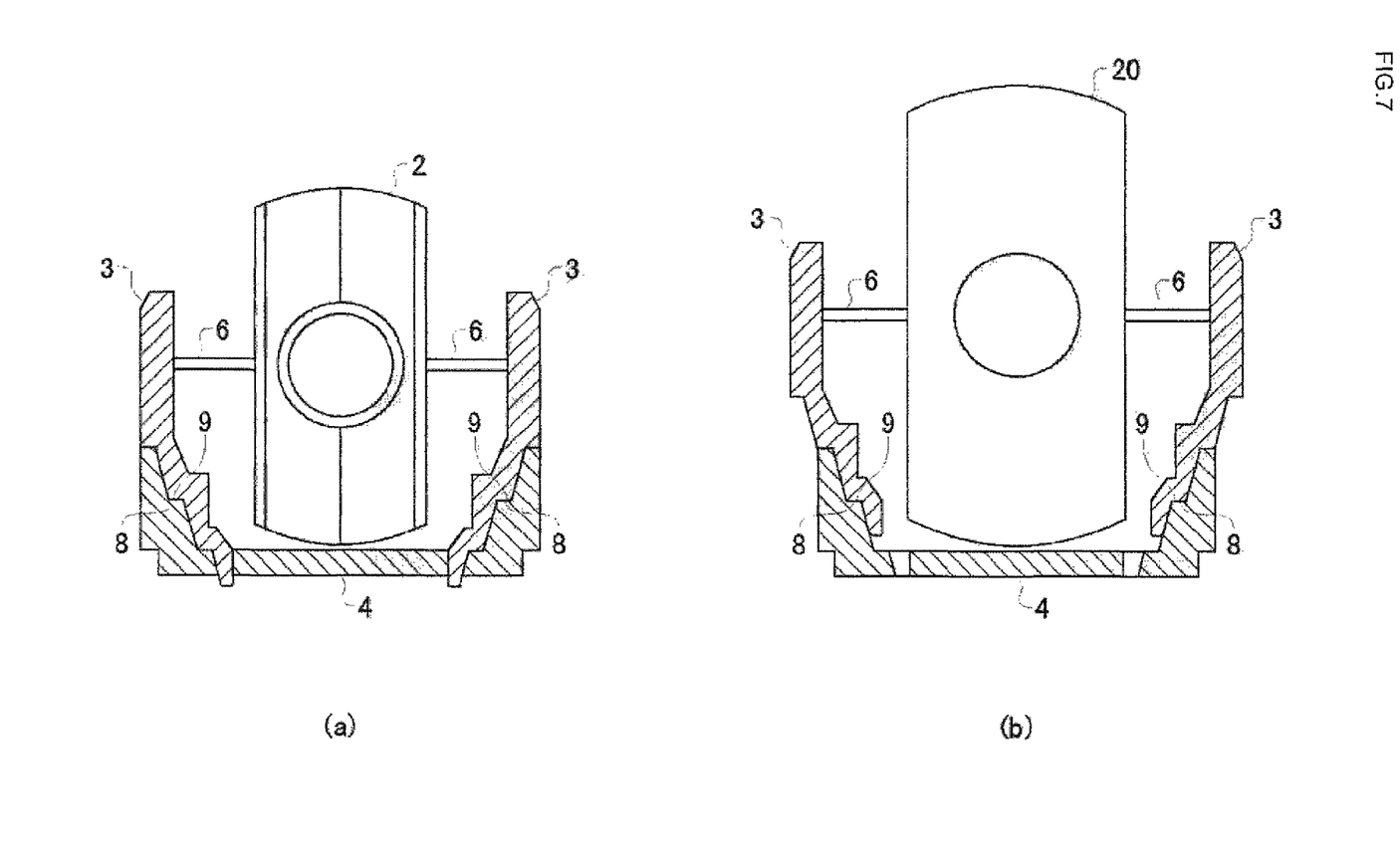
FIG. 7 shows elevational views when lens units of different sizes have been attached.

It is to be noted that although illustration is omitted in FIG. 7, the tilt motor, which drives the lens units 2 and 20 to rotate in the tilt direction, is attached to the tilt shaft 6. Hence, it can also be said that a length of the tilt shaft 6 (a width between the lens units 2 and 20 and the tilt chassis 3) represents a space for storing the tilt motor. In the embodiment, regardless of whether the attaching position of the tilt chassis 3 is on the lower side (refer to FIG. 7(a)) or on the upper side (refer to FIG. 7(b)), the width between the lens units 2 and 20 and the tilt chassis 3 is the same one. Namely, the space for storing the tilt motor is constant regardless of the attaching position of the tilt chassis 3. Hence, regardless of whether the lens unit 2 for 22× zoom magnification is attached using the lower attaching position of the tilt chassis 3 or the lens unit 20 for 30× zoom magnification is attached using the upper attaching position of the tilt chassis 3, the same tilt motor can be mounted. In a manner described above, the tilt motor can be commonized.

The holding ring 5 is formed in a substantially circular ring shape, and flat portions 10 are provided at both right and left sides of the holding ring 5 corresponding to the tilt chassis 3. A space between the right and left flat portions 10 is set to be substantially equal to an outer diameter of an assembly formed by attaching the tilt chassis 3 to the lens unit 2. Namely, the space between the right and left flat portions 10 is set to be a size in which the holding ring 5 exactly fits when attaching the holding ring 5 after the tilt chassis 3 holding the lens unit 2 is attached to the pan chassis 4. Hence, the tilt chassis 3 and the pan chassis 4 are firmly held in the state of being attached to the lens unit 2.

As for the camera device configured as described above, an assembly process of the camera unit 1 will be described with reference to the drawings.

Figure 3:
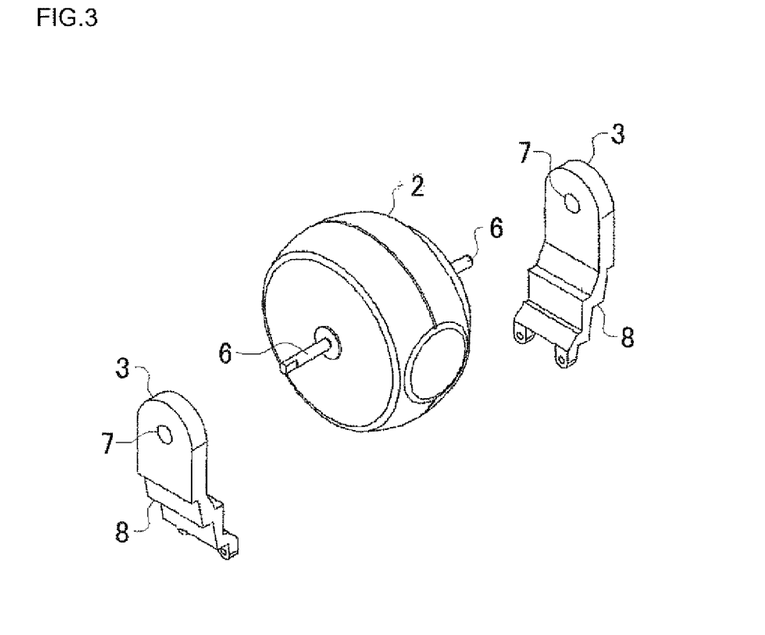
FIG. 3 is a perspective view showing attachment of a tilt chassis to a lens unit.

When assembling the camera unit 1 of the camera device of the embodiment of the present invention, first, the tilt chassis 3 are attached to opposite sides of the lens unit 2 as shown in FIG. 3. At this time, the tilt shaft 6 of the lens unit 2 is inserted in the tilt shaft holes 7 of the tilt chassis 3, and the lens unit 2 is rotatably supported in the tilt direction.

Figure 4:
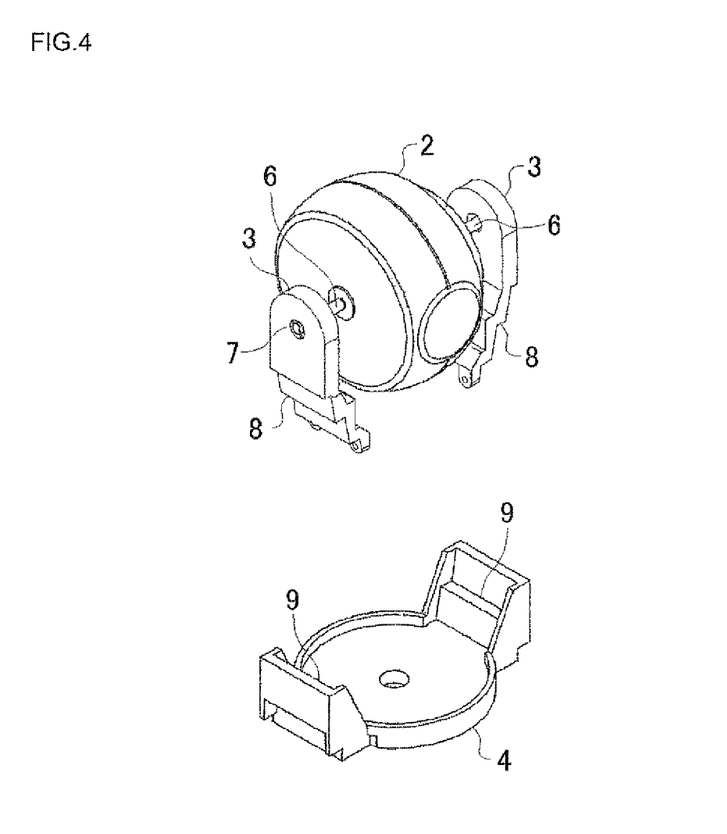
FIG. 4 is a perspective view showing attachment of the lens unit to a pan chassis.

Next, the lens unit 2 held by the tilt chassis 3 is attached to the pan chassis 4 as shown in FIG. 4. At this time, the stepped engagement portions 8 and 9 of the tilt chassis 3 and the pan chassis 4 engage with each other. A case of the lens unit 2 for 22× zoom magnification is exemplified in FIG. 4. Hence, in this case, the stepped engagement portions 8 and 9 of the tilt chassis 3 and the pan chassis 4 engage with each other at the lower attaching positions (engagement positions) corresponding to the width and the height of the lens unit 2 for 22× zoom magnification (refer to FIG. 7(a)).

Figure 5:
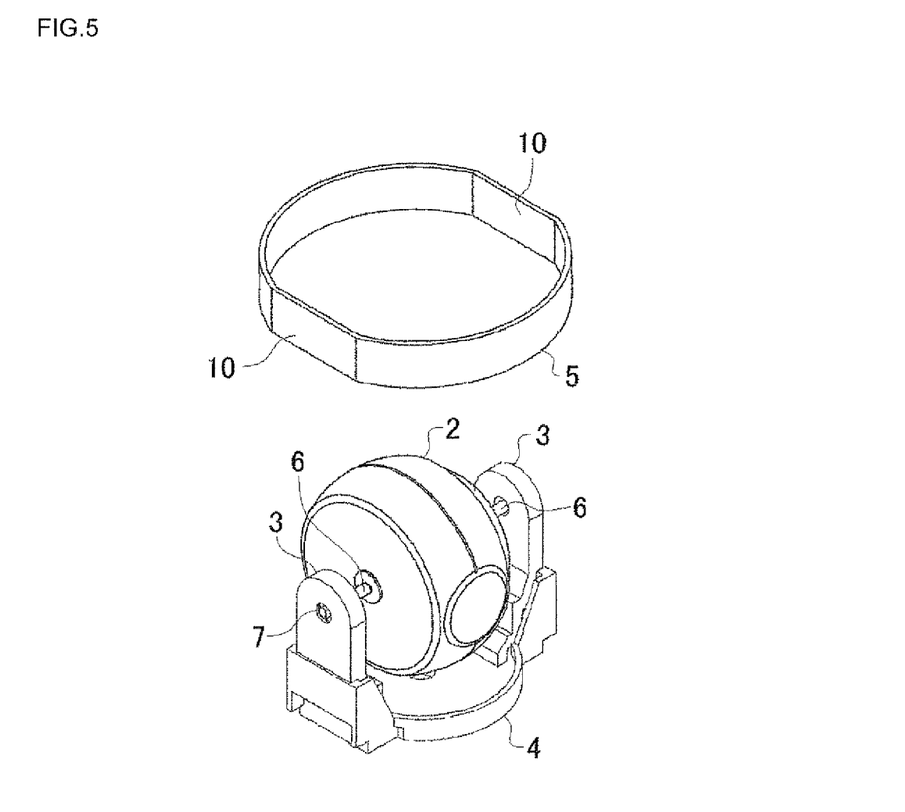
FIG. 5 is a perspective view showing attachment of a holding ring to the lens unit.

Subsequently, the holding ring 5 is attached to the lens unit 2 as shown in FIG. 5. In this case, the holding ring 5 exactly fit in, and the tilt chassis 3 and the pan chassis 4 are firmly held in the state of being attached to the lens unit 2.

According to such camera device of the embodiment, cost, time, and labor required for development of the chassis can be reduced, and development efficiency of the camera device is improved by providing the tilt chassis 3 attached to the pan chassis 4 at the attaching positions according to the size of the lens unit 2.

Figure 6:
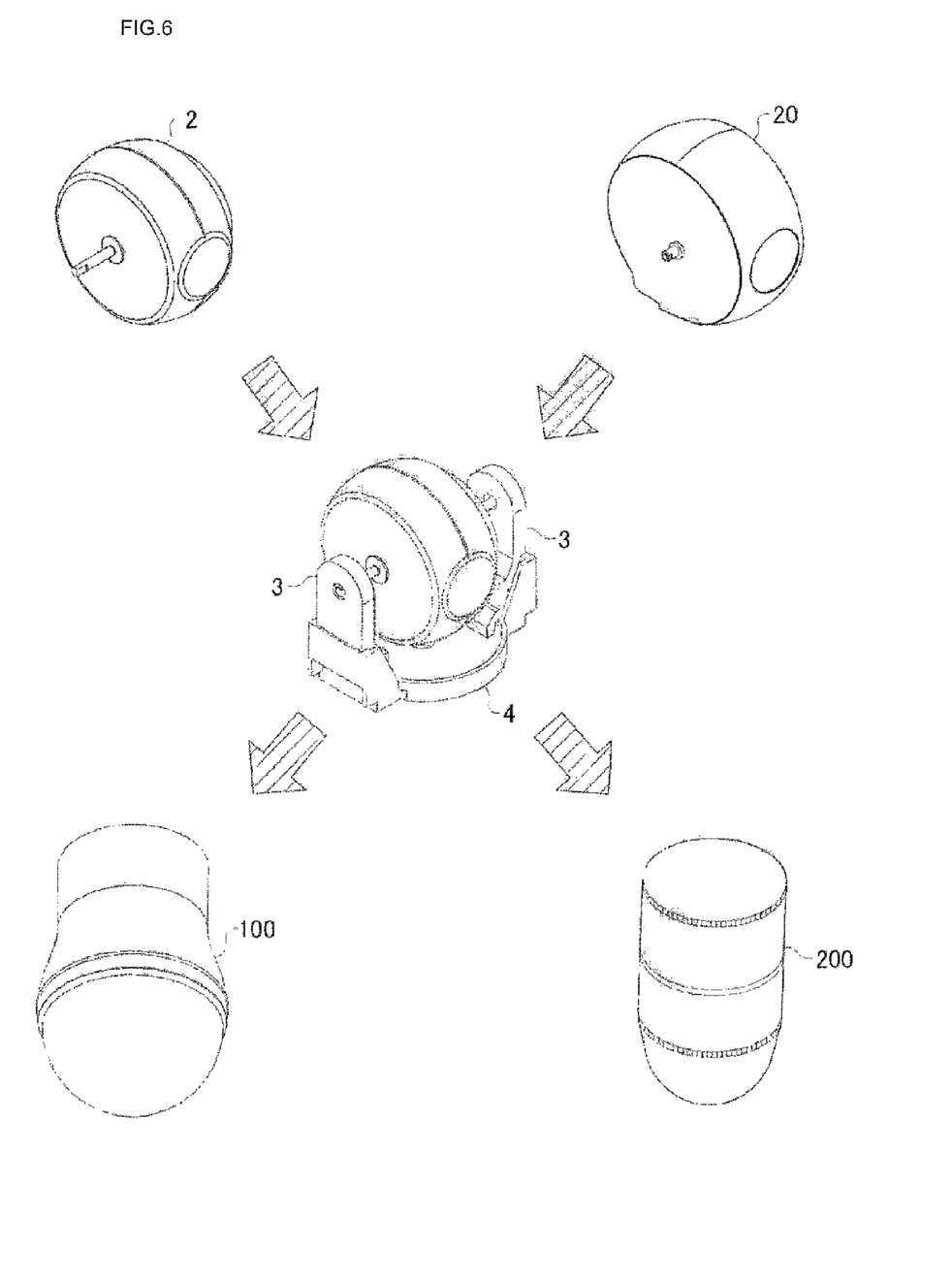
FIG. 6 is an explanatory view showing a flow of development of the camera device.

In a case of a conventional camera device, when designing a chassis that holds lens units 2 different in sizes according to zoom magnification, the chassis has been designed individually tailored to the size of the each lens unit 2. In contrast, in the camera device of the embodiment, even though lens units 2 and 20 different in sizes according to the zoom magnification are developed individually as shown in FIG. 6, one (common) tilt chassis 3 and pan chassis 4 can be used to deal with the difference. Hence, development efficiency of camera devices 100 and 200 is improved.

Namely, in the embodiment, the attaching positions of the tilt chassis 3 to the pan chassis 4 can be adjusted according to the sizes of the lens units 2 and 20 as shown in FIGS. 7(a) and 7(b). Hence, common tilt chassis 3 and pan chassis 4 can be used even though the lens units 2 and 20 are designed in different sizes according to the zoom magnification. Namely, even when the lens units 2 and 20 for different zoom magnification are developed individually, the same tilt chassis 3 and pan chassis 4 can be shared. Hence, cost, time, and labor required for development of the chassis can be reduced, and development efficiency of the chassis is improved.

In this case, since the attaching positions of the tilt chassis 3 to the pan chassis 4 can be adjusted according to widths and heights of the lens units 2 and 20, common tilt chassis 3 and pan chassis 4 can be used to deal with the difference even though the lens units 2 and 20 are designed in different widths and heights according to the zoom magnification.

Specifically, the stepped engagement portions 8 and 9 of the tilt chassis 3 and the pan chassis 4 are engaged with each other, and thereby the attaching positions of the tilt chassis 3 to the pan chassis 4 can be adjusted according to the widths and the heights of the lens units 2 and 20 (refer to FIG. 7).

In addition, in the embodiment, since the tilt chassis 3 and the pan chassis 4 are held in the state of being attached to the lens unit 2 by attaching the holding ring 5 after attaching the tilt chassis 3 to the pan chassis 4, assembly work of the camera device becomes easy. Namely, workability of assembly of the camera device is improved.

As described above, although the embodiment of the present invention has been described by way of examples, the scope of the present invention is not limited to these, and can be changed/modified according to objects within the scope described in claims.

Figure 8:
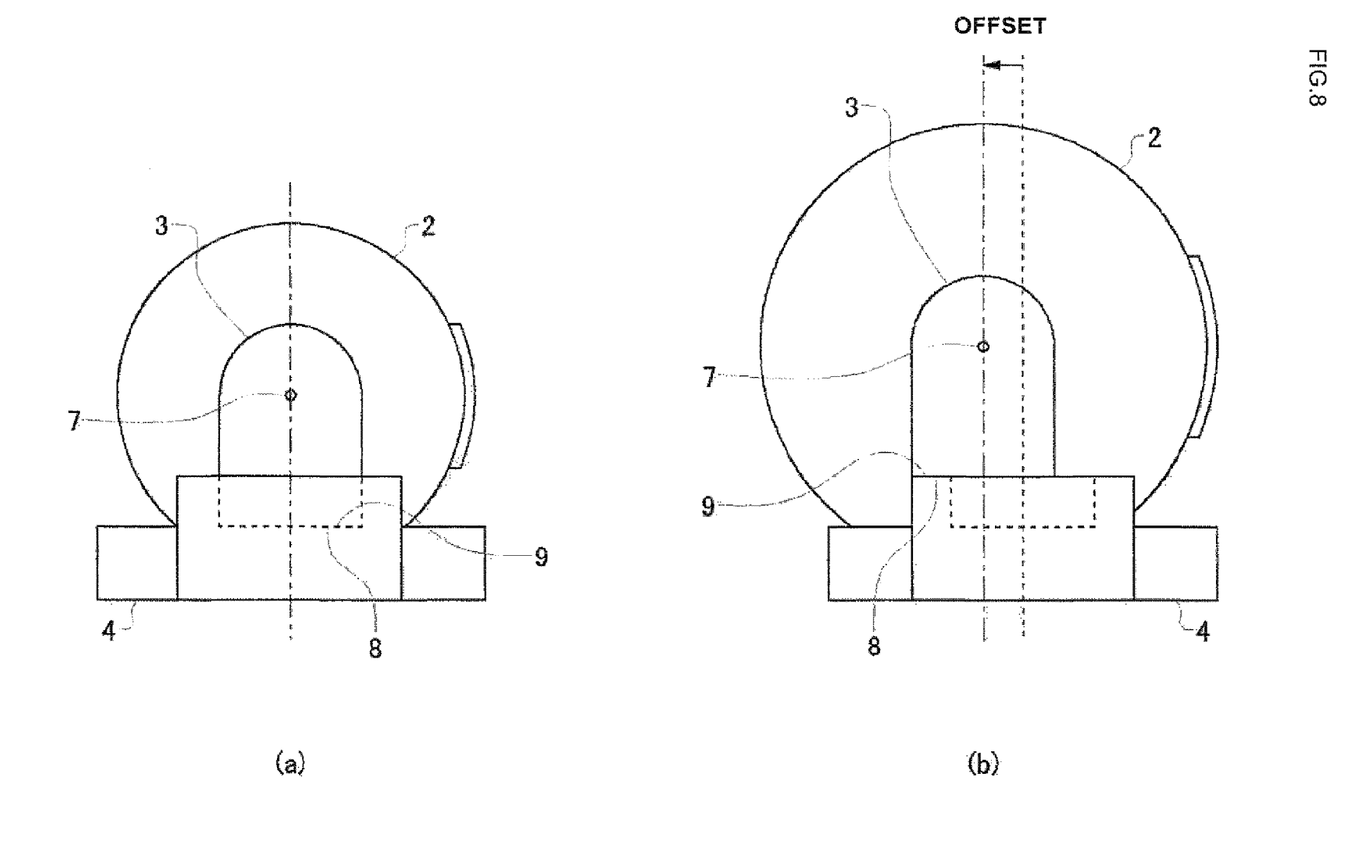
FIG. 8 shows side views of a camera device of an other embodiment.

FIG. 8 is an explanatory view showing a camera device of an other embodiment. In this example, the engagement positions of the stepped engagement portions 8 and 9 of the tilt chassis 3 and the pan chassis 4 can be displaced also in a front-back direction (an optical axis direction, i.e., a horizontal direction in FIG. 8). Namely, when the engagement positions of the stepped engagement portions 8 and 9 are displaced to the upper side, the space between the two tilt chassis 3 becomes wide, the positions of the tilt shaft holes 7 of the tilt chassis 3 become high, and the lens unit 20 is offset at a rear side of the optical axis direction (a left side in FIG. 8) (refer to FIG. 8(b)). The lower attaching position (engagement position) shown in FIG. 8(a) corresponds to the width, the height, and an optical axis offset of the lens unit 2 for 22× zoom magnification (no optical axis offset in this example), and the upper attaching position (engagement position) shown in FIG. 8(b) corresponds to the width, the height, and an optical axis offset of the lens unit 20 for 30× zoom magnification.

According to such camera device of the other embodiment, since the attaching positions of the tilt chassis 3 to the pan chassis 4 can be adjusted according to the optical axis offsets of the lens units 2 and 20, common tilt chassis 3 and pan chassis 4 can be used to deal with the difference even though the different optical axis offsets are set for the lens units 2 and 20 according to the zoom magnification.

In addition, although in the above description, the example has been described in which the step-like stepped engagement portions 8 and 9 are provided at the tilt chassis 3 and the pan chassis 4, the scope of the present invention is not limited to this, and inclined surface portions (not shown) are provided at the tilt chassis 3 and the pan chassis 4 to be located at the attaching positions according to the sizes of the lens units 2 and 20, and thereby the tilt chassis 3 may be attachable to the pan chassis 4.

In addition, although in the above description, the example of "a type of lens unit held from both sides" has been described in which the two tilt chassis 3 are attached to the lens unit 2, the scope of the present invention is not limited to this, and the lens unit of the present invention may be "a type of lens unit held only from one side" in which the one tilt chassis 3 is attached to the lens unit 2.

The preferred embodiments of the present invention that can be considered at present have been described above, and it is intended to be understood that various modifications can be performed with respect to the embodiments, and to include in the appended claims all the various modifications within the true spirit and the scope of the present invention.

INDUSTRIAL APPLICABILITY

As described above, the camera device according to the present invention is useful since it can reduce cost, time, and labor required for development of the chassis, has an effect in which development efficiency of the chassis is improved, and is used as a monitoring camera etc.

REFERENCE SIGNS LIST

1 Camera unit
2 Lens unit
3 Tilt chassis
4 Pan chassis
5 Holding ring
8 Stepped engagement portion
9 Stepped engagement portion
20 Lens unit
100 Camera device
200 Camera device

The invention claimed is:

1. A camera device comprising:
a lens unit having a size according to zoom magnification;
a tilt chassis for rotatably supporting the lens unit in a tilt direction, the tilt chassis being attached to the lens unit; and
a pan chassis for rotatably supporting the lens unit in a pan direction through the tilt chassis, the pan chassis having the tilt chassis attached thereto, wherein
the tilt chassis includes a first attaching area for attaching to the pan chassis and a second attaching area for attaching to the pan chassis, the tilt chassis being attached to the pan chassis alternately at one of the first attaching area and the second attaching area according to the size of the lens unit.

2. The camera device according to claim 1, wherein
the lens unit has a width and a height according to zoom magnification, and
the first and second attaching areas extend in a width direction and a height direction of the lens unit, and is attached to the pan the tilt chassis is attached to the pan chassis alternately at one of the first attaching area and the second attaching area according to the width and the height of the lens unit.

3. The camera device according to claim 1, comprising a holding ring that holds the tilt chassis and the pan chassis in a state of being attached to the lens unit.

4. A camera device comprising:
a lens unit having a size according to zoom magnification;
a tilt chassis for rotatably supporting the lens unit in a tilt direction, the tilt chassis being attached to the lens unit; and
a pan chassis for rotatably supporting the lens unit in a pan direction through the tilt chassis, the pan chassis having the tilt chassis attached thereto, wherein:
the tilt chassis has a plurality of attaching positions to the pan chassis, and is attached to the pan chassis at an attaching position of the plurality of attaching positions according to the size of the lens unit,
the lens unit has a width and a height according to zoom magnification,
the tilt chassis has a plurality of different attaching positions in a width direction and a height direction of the lens unit, and is attached to the pan chassis at an attaching position of the plurality of attaching positions according to the width and the height of the lens unit,
a plurality of stepped engagement portions are provided at positions corresponding to the plurality of attaching positions at the tilt chassis and the pan chassis, and
the tilt chassis is attached to the pan chassis at an attaching position of the plurality of attaching positions according to the width and the height of the lens unit by engaging with each other the stepped engagement portions corresponding to the attaching positions according to the width and the height of the lens unit.

5. A camera device comprising:
a lens unit having a size according to zoom magnification;
a tilt chassis for rotatably supporting the lens unit in a tilt direction, the tilt chassis being attached to the lens unit; and
pan chassis for rotatably supporting the lens unit in a pan direction through the tilt chassis, the pan chassis having the tilt chassis attached thereto, wherein:
the tilt chassis has a plurality of attaching positions to the pan chassis, and is attached to the pan chassis at an attaching position of the plurality of attaching positions according to the size of the lens unit,
an optical axis offset according to zoom magnification is set for the lens unit, and
the tilt chassis has a plurality of different attaching positions in an offset direction of the lens unit, and is attached to the pan chassis at an attaching position of the plurality of attaching positions according to the optical axis offset of the lens unit.

6. A method for assembling a camera device including:
attaching a tilt chassis to a lens unit having a size according to zoom magnification to rotatably support the lens unit in a tilt direction; and
attaching the tilt chassis to a pan chassis to rotatably support the lens unit in a pan direction through the tilt chassis, wherein
the tilt chassis includes a first attaching area for attaching to the pan chassis and a second attaching area for attaching to the pan chassis, the tilt chassis being attached to the pan chassis alternately at one of the first attaching area and the second attaching area according to the size of the lens unit.

* * * * *